W. RENO.
Horse Hay-Rake.

No. 199,994. Patented Feb. 5, 1878.

WITNESSES:
H. Rydquist
J. H. Scarborough

INVENTOR:
W. Reno
BY Munn & Co.
ATTORNEYS.

N. PETERS, PHOTO-LITHOGRAPHER, WASHINGTON, D. C.

UNITED STATES PATENT OFFICE.

WILLIAM RENO, OF LA FAYETTE, ASSIGNOR TO HIMSELF, GEORGE W. HEATH, AND JAMES HEATH, OF SAME PLACE; SAID G. W. AND J. HEATH ASSIGNORS TO ELIJAH M. WITTER, OF WEST JEFFERSON, OHIO.

IMPROVEMENT IN HORSE HAY-RAKES.

Specification forming part of Letters Patent No. 199,994, dated February 5, 1878; application filed December 23, 1876.

*To all whom it may concern:*

Figure 1:
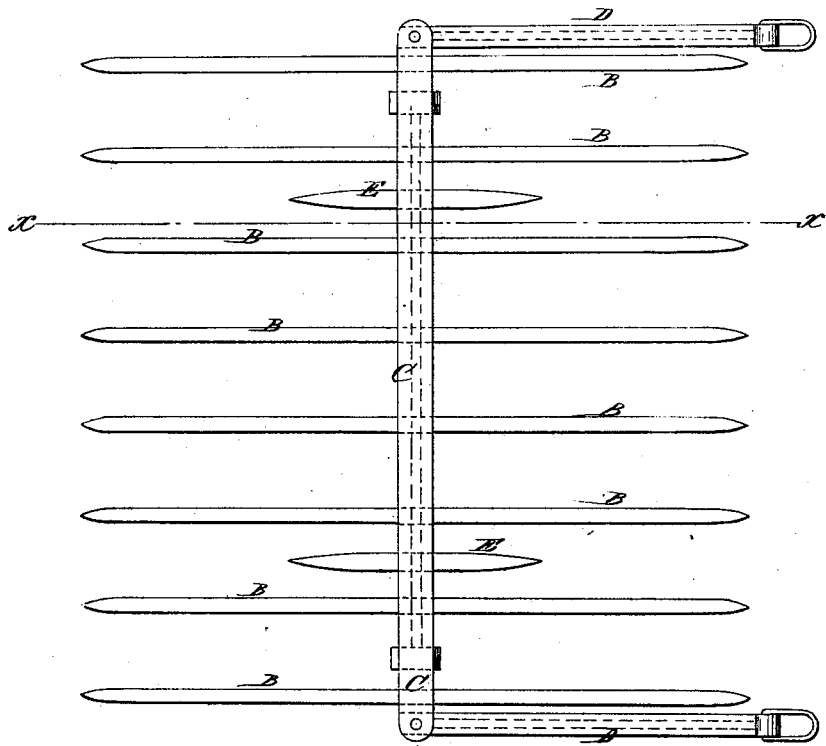
Figure 2:
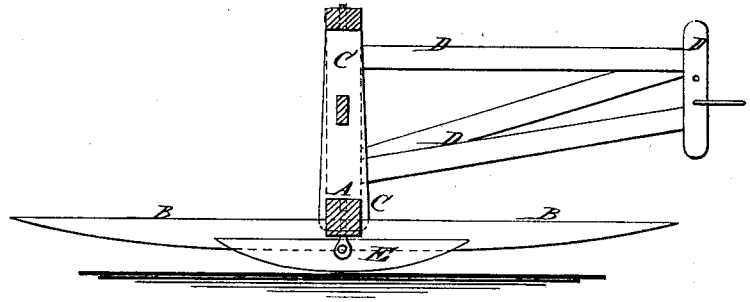

Be it known that I, WILLIAM RENO, of La Fayette, in the county of Madison and State of Ohio, have invented a new and useful Improvement in Hay-Gatherers, of which the following is a specification:

Figure 1 is a top view of my improved hay-gatherer. Fig. 2 is a vertical section of the same, taken through the line $x\ x$, Fig. 1.

The object of this invention is to furnish an improved machine for gathering hay and hauling it to a stack or other place, and which shall be simple in construction, and convenient and effective in operation, enabling the hay to be gathered rapidly and cleanly, and at small expense.

The invention will first be described in connection with the drawing, and then pointed out in the claim.

A is the head-piece, which is made about ten feet long, and in its lower side are formed cross-grooves, in which the middle parts of the teeth B are secured. The teeth B are made about eleven feet long, are straight upon the upper side, and are curved upon the lower side, as shown in Fig. 2.

To the head-piece A is secured an upright frame, C, to keep the hay from sliding back and off while being drawn across the meadow. To the ends of the upright frame C are hinged the swinging frames D, which are strengthened by inclined braces, and in the outer upright bars of which are formed a number of holes to receive the clevises to which the horses are attached, so that the point of draft attachment may be adjusted higher or lower, to cause the points of the teeth to work farther from or closer to the ground, as may be desired.

To the lower side of the head-piece A are hinged, by eyebolts or other convenient means, two or more runners, E, which are made straight upon the upper side and curved upon the lower side. The runners E project below the teeth B, so as to hold the head-piece A and teeth B clear of the ground, to prevent them from being worn. The hinges of the runners E enable them to bear squarely upon the ground, whether the teeth B be inclined or horizontal.

In operating the machine, one horse is attached to each of the hinged draw-frames D, the two horses are connected by a jockey-stick about ten feet long, and one of the horses is ridden by a boy.

When the loaded machine has been drawn to the stack the pitcher unsnaps the jockey-stick, and the horses are turned around from each other. The pitcher then snaps the jockey-stick into the bit-ring, and the boy rides away to gather another load, the teeth B slipping out from beneath the collected hay, and adjusting themselves into position to again collect hay.

Having thus described my invention, I claim as new and desire to secure by Letters Patent—

The combination, with the rake A B C D, of the shoes E E, pivoted at their middle to the rake-head A, as and for the purpose specified.

WILLIAM RENO.

Witnesses:
C. STEWART,
JOHN McCARTNEY.